UNITED STATES PATENT OFFICE.

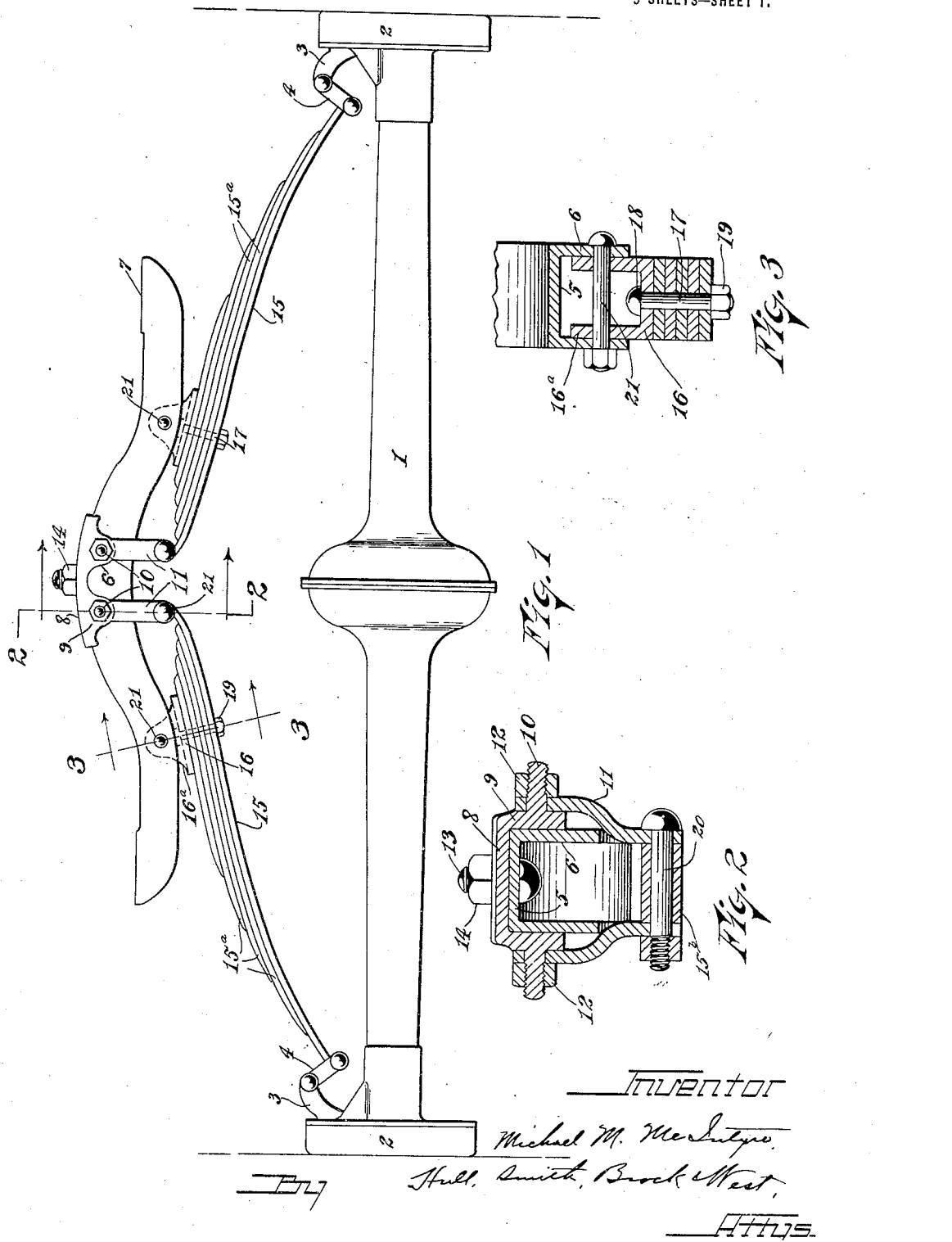

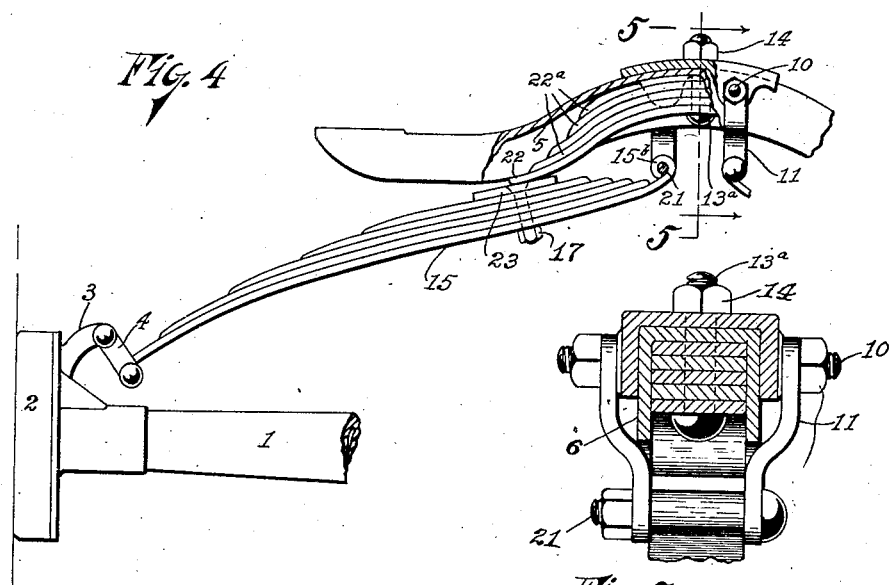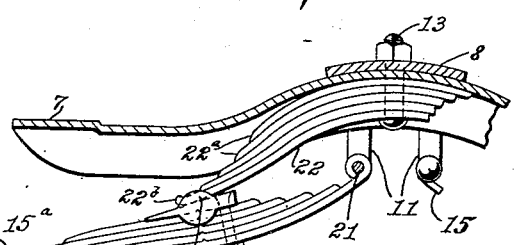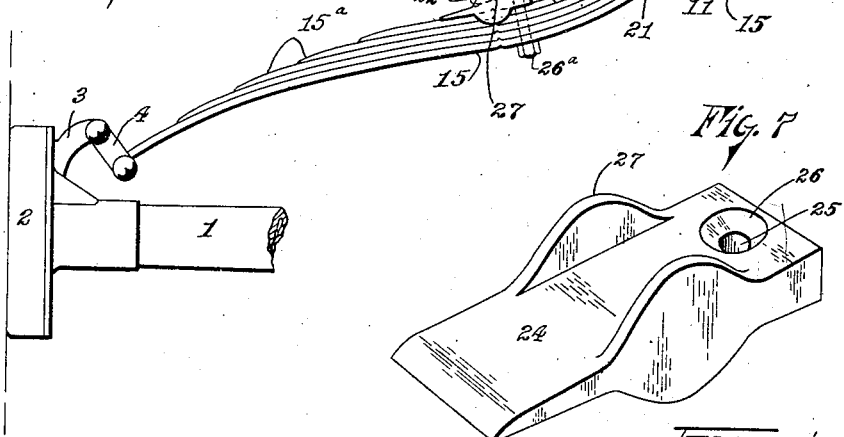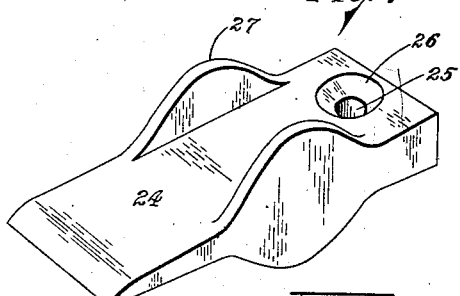

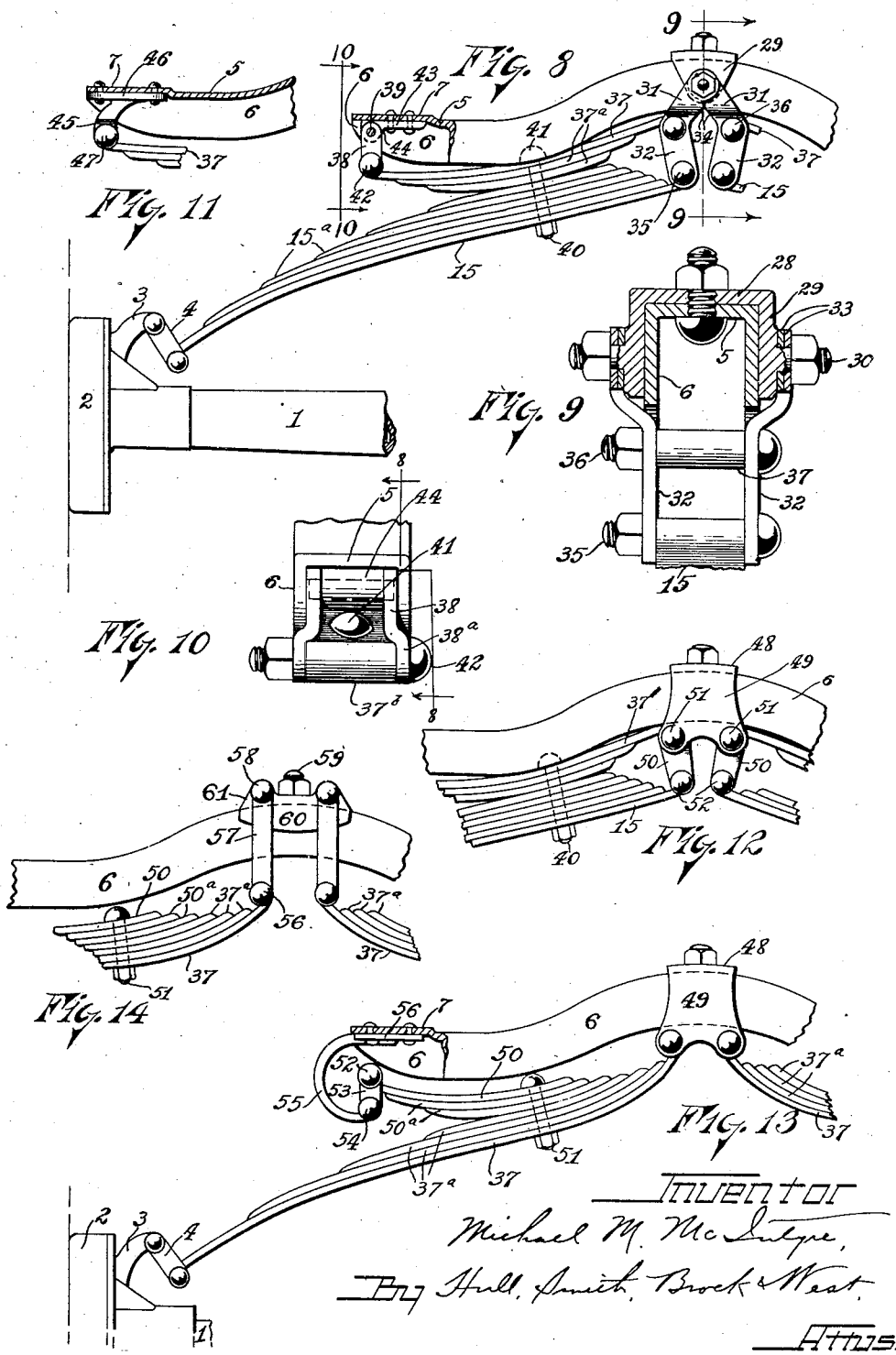

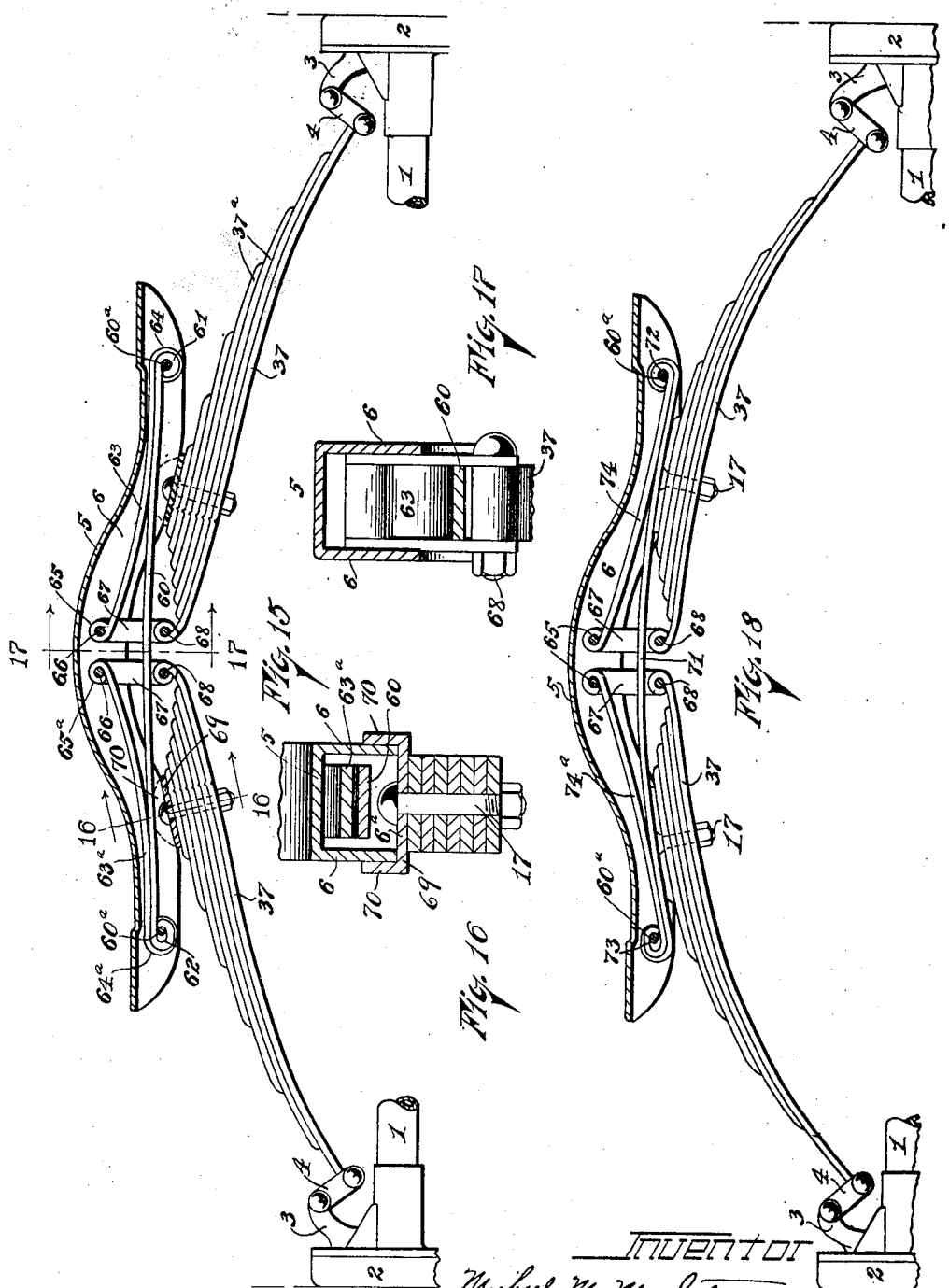

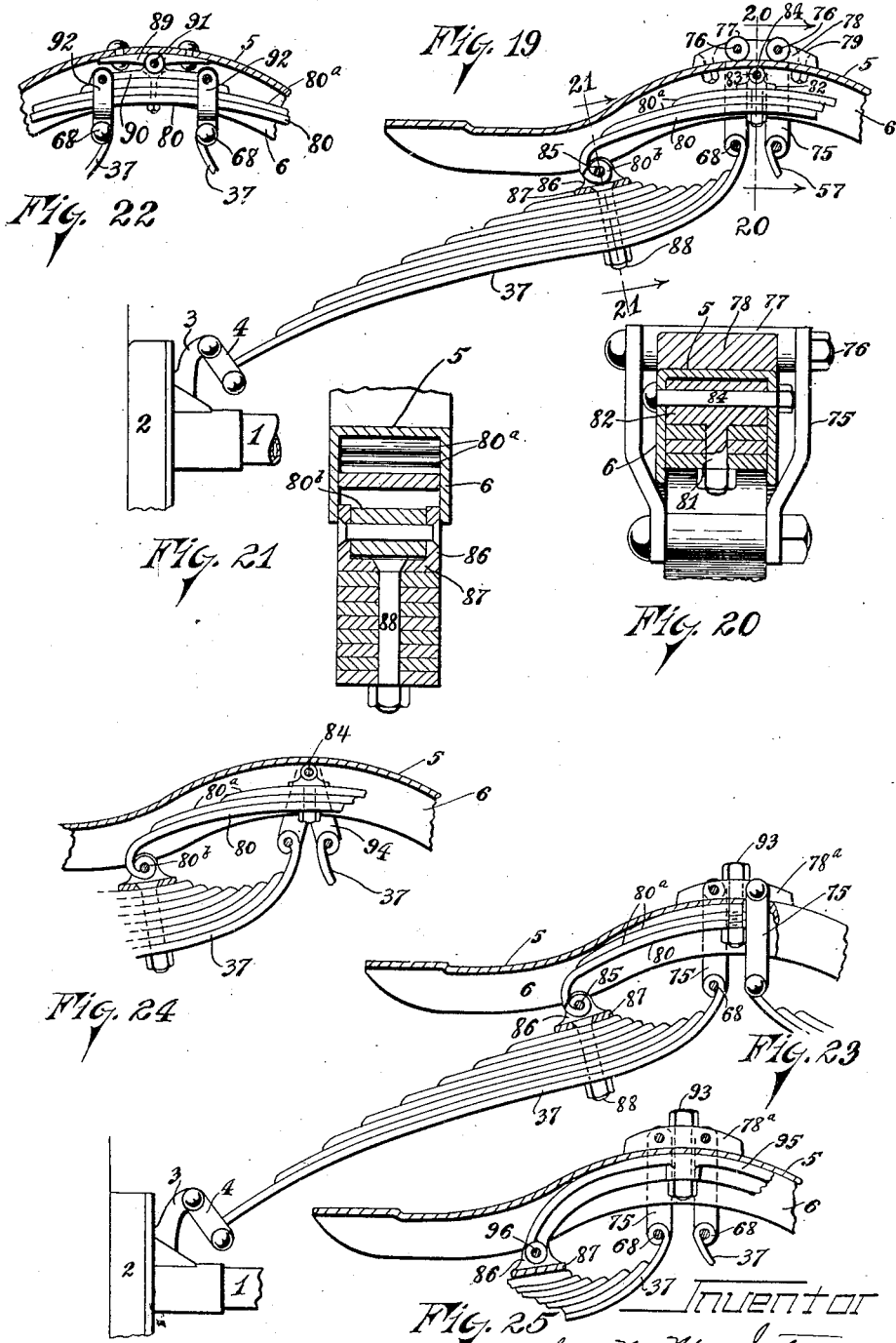

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,348,726.   Specification of Letters Patent.   Patented Aug. 3, 1920.

Application filed July 29, 1915. Serial No. 42,502.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and, while certain features thereof will doubtless be of more general application, the invention disclosed herein is designed with particular reference to the art of cross-springs, such as are used on the present type of Ford automobiles. Referring to springs of the last mentioned type, it is the general purpose of the invention to construct, connect, and support such springs in a manner whereby ease of riding may be obtained and this result may be secured in an economical manner. Further and more limited objects of the invention will appear hereinafter, and may be defined generally as consisting of the combinations of elements embodied in the claims hereto annexed and illustrated in the drawings accompanying and forming part hereof wherein Figure 1 represents an elevation of the rear axle of an automobile having applied thereto a spring constructed in accordance with my invention, the spring and the cross bar being also shown in elevation; Figs. 2 and 3 are sectional details corresponding respectively to the lines 2—2 and 3—3 of Fig. 1; Fig. 4 is an elevation of part of the rear axle of an automobile and part of an improved form of spring, certain parts being shown in section; Fig. 5 is a sectional detail corresponding to the line 5—5 of Fig. 4; Fig. 6 is a view, similar to Fig. 4, of a modification of the spring shown in Fig. 4; Fig. 7 is a perspective view of the bearing plate shown in Fig. 6; Fig. 8 is a view, similar to Fig. 4, of a further modification of the invention, one end of the cross-bar being shown in section—see line 8—8, Fig. 10; Fig. 9 is a sectional view corresponding to the line 9—9 of Fig. 8; Fig. 10 is an end elevation showing the manner of connecting the auxiliary spring to the cross bar or frame, the view being taken from the left hand end, as indicated by the line 10—10 on Fig. 8. Fig. 11 is a detail, partly in section and partly in elevation, illustrating a modified manner of connecting the outer end of the auxiliary spring to the cross bar or frame; Fig. 12 is a detail in elevation illustrating a modification of the manner of connecting the inner ends of the main and auxiliary springs to the cross bar; Fig. 13 is a view, similar to Fig. 8, of a still further modified form of the invention; Fig. 14 is a detail in elevation of a modified form of support for the inner end of the combined main and auxiliary spring shown in Fig. 13; Fig. 15 is a view similar to Fig. 1, of a still further modified form of my invention, the cross bar being shown in section; Figs. 16 and 17 are sectional details corresponding respectively to the lines 16—16 and 17—17 of Fig. 15; Fig. 18 is a view similar to Fig. 15, of a slightly modified form of the invention shown in the former figure; Fig. 19 is a view similar to Fig. 8, of a still further modified form of my invention; Figs. 20 and 21 are sectional details corresponding respectively to the lines 20—20 and 21—21 of Fig. 19; Fig. 22 is a sectional detail illustrating a modified form of connection between the inner ends of the main springs shown in Fig. 19; Fig. 23 is a view, similar to Fig. 19, of a still further modification of my invention; Fig. 24 is a detail, partly in section and partly in elevation, illustrating a modification of the connection between the main and auxiliary springs shown in Fig. 23; and Fig. 25 is a detail, partly in section and partly in elevation, of a still further modified form of the invention shown in Fig. 23.

Describing by reference characters the various parts illustrated herein 1 denotes the rear axle housing of an automobile and 2 the brake drums thereof. The rear axle, the general type of spring shown herein, and the connections between the springs and the axle are such as are now generally employed in connection with Ford automobiles, wherein the opposite ends of the rear spring are supported by shackles 4 carried by arms or brackets 3, supported by the brake drums. It will be understood, however, that the ends of the main springs shown herein may be supported in any other desired or convenient manner. Coöperating with the parts just described is a vehicle frame member which, for convenience of description, will be referred to specifically hereinafter as a "cross bar." This frame member or cross bar in all of the embodiments of my invention disclosed herein consists generally of a channeled member comprising the web 5 and the downturned flanges 6—see Figs. 2 and 3. This cross bar has an upwardly directed convex central portion, the opposite branches of the cross bar curving downwardly from the central portion, the ends of the web forming bearing surfaces 7, whereby the cross bar may be conveniently connected to the side sills.

8 denotes a plate which is applied to the top of the central portion of the cross bar 5, said plate having depending side flanges 9 which embrace the side flanges 6, each side flange 9 being provided, on opposite sides of the center with a pair of longitudinally spaced outwardly projecting studs 10 constituting pins which support shackle links 11. These shackle links are preferably of the shape shown in detail in Fig. 2, being curved inwardly at their lower ends whereby such ends are substantially the width of the cross bar. Each pair of shackle links 11 forms a support for the inner end of one of the sections of my main cross spring. The shackle links are secured to their respective studs by means of nuts 12 threaded onto the ends of the studs 10, and the plate 8 may be conveniently secured to the cross bar by means of a short bolt 13 having a nut 14 on the upper end thereof.

In place of the usual continuous cross spring which is connected to the shackles 4 and to the cross bar, I employ two springs or spring sections each comprising a main plate 15 and a suitable number of auxiliary plates 15$^a$ connected by means of a U-shaped bracket 16 extending across the top of the uppermost plate and a bolt 17 having its head 18 engaging the web of the bracket, the lower end of the bolt being provided with a nut 19. The spring sections are preferably of the shape shown in the drawing whereby the upper and inner end of each section (the part extending inwardly and upwardly beyond the bolt 17) will be short and stiff as compared with the lower and outer part of each spring section. The upper and inner end of the main plate 15 of each spring section is connected to the lower ends of a pair of shackle links 11 by means of a shackle pin 20 extending through an eye 15$^b$ in such main plate, while the body portion of each spring section will be pivotally connected to the cross bar by means of a bolt 21 extending through the flanges of the cross bar and through the upwardly projecting flanges 16$^a$ of the bracket.

With the construction described, each spring section will be pivotally connected to the cross bar by the bolt 21 while its upper and inner end will be flexibly connected to the central portion of the cross bar by means of the shackle links 11. The spring construction just described is applicable to the cross bars and rear axles of Ford cars as at present designed and, because of the manner of constructing the spring sections and of connecting the same to the cross bar, the substitution of my form of springs for the present type of Ford springs can be made in an extremely convenient manner, with very slight additional cost, and will result in greatly improved riding qualities due to the correspondingly increased flexibility of the springs.

In Figs. 4 and 5 there is shown a further modification of the invention wherein the parts shown in Figs. 1–3 which are duplicated in Fig. 4 are indicated by identical reference characters. In this modification the bolt 13$^a$ is made sufficiently longer than the bolt 13 to extend through the central portion of an auxiliary spring, the main leaf 22 whereof is directed downwardly and bears at each end upon a bearing plate 23 on top of the adjacent main spring section, the uppermost of the auxiliary leaves 22$^a$ bearing against the web 5 of the cross bar and the auxiliary spring being secured between the flanges of said cross bar and against said web by the bolt 13$^a$, the nut whereof is indicated at 14. The construction shown in this figure interposes between the body portion of each main spring section and the cross bar a yielding end of the auxiliary spring and secures an extremely easy-riding arrangement.

In Figs. 6 and 7 there are shown slight modifications of the spring arrangement illustrated in Figs. 4 and 5. In these views, each main spring section is supported in the same manner as shown in the earlier figures and is designated by the same reference characters that appear thereon. The ends of the main leaf 22 of the auxiliary spring, however, engages a special bearing plate on each of the main spring sections. This bearing plate comprises generally a body 24 which is tapered, whereby it increases in thickness from the outer toward the inner portion of the main spring section, the inner and widened end being provided with a bore 25 having a countersunk recess 26 for the head of a bolt 26$^a$ which extends through the plates 15, 15$^a$ and thereby secures them together and to the plate.

The plate is provided at opposite sides thereof with upwardly projecting ears 27 adapted to receive therebetween the end of the main plate 22 of the auxiliary spring, and such end of the main plate is preferably bent upwardly, as shown at 22$^b$. The ears or lugs 27 serve to retain the plate 22 in operative relation to the corresponding main spring section and also to secure proper alinement between the main spring sections, the auxiliary spring ends, and the cross bar thereabove.

In Figs. 8, 9 and 10, there is illustrated a further modification of my invention wherein each main spring section is connected back to back to an auxiliary spring section, the inner end of each main spring section and of its corresponding auxiliary spring section being connected to a common shackle, while the opposite end of each auxiliary spring section is connected to a shackle depending from the outer end of the cross bar. In these views, an inverted U-shaped bracket is applied to the central portion of the cross bar, said bracket comprising a web 28 adapted to rest on top of the web 5 of the cross bar and depending flanges 29 adapted to engage the flanges 6 of said bar, the flanges 29 being provided with outwardly projecting studs 30. These studs support each a pair of shackle links, said links comprising each a pair of angularly arranged arms 31 and 32. Each arm 31 is bent inwardly at its lower portion whereby the arms 32 depend substantially in the same plane as the flange 6—see Fig. 9. The upper ends of the arms 31 of each side pair of links or shackles are reduced in thickness at the pivotal portion thereof—see 33. Each lower arm 32 coöperates with the lower arm of the corresponding shackle on the opposite side of the cross bar to support bolts or pins 35, 36, which extend through the eyes formed respectively on the main plate 15 of the adjacent main spring section and on the main plate 37 of the auxiliary spring section. The opposite end of each auxiliarly spring main plate 37 is supported by means of shackles 38 depending from a pin 39 which is located between the outer ends of the webs 6 of the cross bar. The main and auxiliary springs are connected by means of a bolt 40 extending through their body portions, the bolt having a head 41. The shackle links 38 are bent outwardly at their lower ends, as shown at 38ª thereby to accommodate the width of the eye 37ᵇ on the end of the auxiliary spring, which spring is preferably of just sufficient width to be received between the flanges 6 of the cross bar. 42 denotes the bolt or pin which secures the outer end of each auxiliary spring to the shackles 38. As a convenient means for supporting the upper ends of the shackles 38 from the cross bar, I may use a plate 43 riveted to the part 7 of the cross bar and having a sleeve portion 44 which constitutes a support for the pin 39.

In Fig. 11 I have shown a modification of the connection between the outer end of the main plate 37 of the auxiliary spring and the cross bar wherein, instead of using a shackle for the outer end of each auxiliary spring, I connect such end rigidly to an arm 45 depending from a plate 46 which may be riveted to the portion 7 of the cross bar, the arm 45 supporting the pin or bolt 47 which extends through the eye of the auxiliary spring.

In Fig. 12 I have shown a modification of the connection between the inner ends of the main and auxiliary springs of Fig. 8 and the cross bar. In this view, there is shown an inverted U shaped plate applied to the cross bar which supports a pair of ordinary shackles instead of the special shackles shown in Fig. 8. The plate referred to comprises a web 48 and depending side flanges 49, said flanges extending below the cross bar and being of such width at their lower ends as to support therefrom two pairs of longitudinally spaced shackles 50. The pins or bolts 51 which connect the upper ends of the shackles to the bottom of the flanges 49 form each a support for the eye on the end of the main plate 37 of the adjacent auxiliary spring section, while the pin or bolt 52 which extends through the lower ends of each pair of shackle links supports the eye of the adjacent main plate 15. The outer end of each auxiliary spring section is preferably supported flexibly, in the manner shown in Fig. 8.

In Fig. 13 there is shown a still further modification of my invention wherein one end only of each auxiliary spring is spaced from the main spring, the combined inner ends of the main and auxiliary springs being connected to the cross bar and this single connection being the only connection between both the main spring and the auxiliary spring and the central portion of the cross bar. Each main spring section is shown as consisting of a main plate 37 with a plurality of superposed auxiliary plates 37ª. The inner end of the main spring is shorter than the outer end and the auxiliary spring consists of a main plate 50 and a number of auxiliary plates 50ª. The main and auxiliary springs are connected at their body portions by means of a bolt 51, this bolt extending through the body portions of the springs at a point much nearer the inner end of the spring assembly than the outer end thereof. The inner end of the main plate extends beyond the bolt 51 a short distance while the inner ends of the plates 50ª extend progressively increasing distances beyond such bolt, whereby the inner ends of the plates of the main and auxiliary spring sections provide a spring construction having a short but yielding inner end. As shown, the outer part of the auxiliary spring provides a substantially V-shaped space with the subjacent portion of the main spring, the outer end of the auxiliary spring being connected to a bolt or pin 52 extending through the upper ends of a pair of shackle links 53 the lower ends whereof are supported by a pin 54 carried by the lower end of a curved or scroll spring hanger 55, the upper end whereof is provided with a plate 56 which extends between the flanges 6 and is riveted or otherwise suitably secured to the portion 7 of the cross bar.

In Fig. 14 there is shown a modification of the spring construction illustrated in Fig. 13 wherein the inner ends of the main plates 37 are connected to bolts or pins 56 extending through the lower ends of swinging shackles 57, the upper ends whereof are supported by means of pins or bolts 58 which in turn are supported by a plate fastened to the cross bar by means of a bolt 59, said plate having side flanges 60 adapted to engage the flanges 6 of the cross bar and having ears 61 forming supports for the pins or bolts 58. The outer ends of the main and auxiliary spring sections may be supported in the same manner as the corresponding parts of the springs shown in Fig. 13.

In Figs. 15–17 inclusive there is shown another modification of my invention wherein the inner ends of the main springs are supported by a special type of auxiliary spring. This spring comprises a plate 60 and two coöperating spring plates. The plate 60 has an ordinary round eye 61 at one end thereof and an elongated or box-eye 62 at the opposite end thereof. One of the coöperating spring plates 63 has an eye 64 at one end thereof wrapped around the eye 61, the plate 63 extending along the plate 60 for part of the distance from the eye 61 toward the center of the last mentioned plate but diverging therefrom at the central portion and there provided with an eye 65 which is connected to a pin 66 extending therethrough and connected to shackle links 67, which links extend downwardly on each side of the spring plate 60 and are connected at their lower ends to a pin or bolt 68 which extends through the eye on the end of the main plate 37 of one of the main spring sections. The other auxiliary spring plate 63 is similar to the plate 63 in all respects except that its eye 64$^a$ is wrapped around the box-eye or elongated eye 62 of the adjacent end of the plate 60. The plate 63$^a$ extends inwardly, nearly to the center of the cross bar, and is there provided with an eye 65$^a$, substantially identical with the eye 65 and connected to a pin or bolt 66 which supports a pair of shackle links 67 the lower ends whereof are connected to the eye on the end of the adjacent main plate 37. The plates 63, 63$^a$ project upwardly between the flanges 6. The pins 60$^a$ which support the ends of the plates 60, 63, and 63$^a$, are supported by the flanges 6 of the cross bar. Each main spring is provided, on top of the short plate thereof, with a bracket comprising a web 69 and a pair of upwardly projecting ears or lugs 70 which are adapted to extend on each side of the flanges 6 thereby to position the parts.

In Fig. 18 there is shown a modification of the invention shown in Figs. 15–17 wherein the lower spring plate 71 is bowed upwardly at its central portion, instead of being straight, as is the case with the spring plate 60, and is provided with upwardly directed eyes 72 and 73 at its opposite ends, which eyes however are of the same character as the eyes 61 and 62 respectively of Fig. 15, but are wrapped around correspondingly shaped eyes on the ends of the auxiliary spring plates 74, 74$^a$. The upper spring plates 74 and 74$^a$ are substantially identical with the plates 63, 63$^a$ shown in Fig. 15 except that the eyes thereof are directed upwardly and receive directly therewithin the pins or bolts 60$^a$, being surrounded by the eyes on the ends of the spring plate 71. The inner ends of the spring plates 74, 74$^a$ are connected to the pins or bolts 65 which in turn support the shackles 67. The lower ends of the shackles support the pins or bolts 68 which in turn are connected to the eyes of the main plates 37. The construction shown in Figs. 15–18 inclusive provides an extremely efficient and easy riding spring.

In the case of the inventions disclosed in Figs. 15–18, the elongated or "box" eyes at the ends of the spring plates 60 and 71 provide a lost motion connection between the cross bar and the springs on rebound whereby easier riding is secured. Movements in the reverse direction will be cushioned by the closing of the V-spaces between the plates 60, 71 and the plates 63, 74, thereabove.

In Figs. 19–21 there is shown a further modification of the invention. In these views, the inner ends of the main spring sections are flexibly supported from the cross bar by pairs of shackle links 75 the pair for each spring end being pivotally supported at the upper end by means of a bolt 76 extending through a suitable bushing or sleeve 77 carried by a plate 78 which may be bolted or otherwise secured to the web 5 of the cross bar, as indicated at 79. The shackles extend upwardly on each side of the cross bar and are bent inwardly at their lower ends whereby the distance between such lower ends is substantially equal to the width of the cross bar. The plate 78 forms a support for both pairs of shackle links. 80 denotes the main plate of an auxiliary spring and 80$^a$ the additional plates. This spring is shown as a short elliptical spring having its central portion bowed upwardly, the plates of the auxiliary spring being connected by a center bolt 81 which may be conveniently formed as part of a plate 82 having a sleeve or bushing 83 which is adapted to receive a pin or bolt 84 extending through and supported by the flanges 6, whereby the auxiliary spring is pivotally supported at its center. The main plate 80 is provided with downwardly directed eyes 80ᵇ, and each eye is shown as pivotally connected to its adjacent main spring section by means of a pin or bolt 85 extending through said eye and through a pair of lugs 86 carried by a plate 87 which is secured to each main spring section by means of the bolt 88. The plate 87 will preferably be of such width that the ears 86 may pass between the downwardly extending flanges 6 of the cross bar.

In Fig. 22 there is shown a modification of the invention illustrated in Figs. 19–21 wherein the center of the auxiliary spring is pivotally connected to the cross bar by means of a plate 89 riveted or otherwise suitably secured to the web 5 thereof, said plate 89 coöperating with a plate 90 on top of the auxiliary spring and a bolt 91 to afford such pivotal connection. Instead of connecting the inner ends of the main spring to shackles arranged as shown in Figs. 19–21, these spring ends may be connected to shackles 92 the upper ends whereof are journaled to the plate 90 carried by the center of the auxiliary spring and the lower ends whereof are connected to the main plates 37 by the pins or bolts 68.

In Figs 23 and 24 there are illustrated still further modifications of the spring construction shown in Figs. 19–21. In Fig. 23, the inner ends of the main spring sections are shown as supported in substantially the same manner as the inner ends of the main spring sections in Fig. 19, the only difference being that the block or plate 78ᵃ which supports the shackle links 75 is connected to the web of the cross bar by means of a center bolt 93 which bolt extends through the center of the auxiliary spring and connects said auxiliary spring to the cross bar. The auxiliary spring 80, 80ᵃ is in all other respects similar to the springs shown in Figs. 19–21 and is connected to the main spring sections in identically the came manner as shown in such preceding figures.

In Fig. 24 the auxiliary spring 80, 80ᵃ is constructed in the same manner as the auxiliary spring in Fig. 19 and is connected to the main spring sections and to the cross bar in the same manner as shown in such preceding figure. The ends of the main springs, however, are shown as connected to shackle links 94 which may be supported by the pin or bolt 84 that connects the auxiliary spring to the cross bar.

In Fig. 25 I have shown a still further modification of the invention of Figs. 19–21 wherein, instead of connecting the body portions of the main spring sections to an auxiliary spring which is pivotally supported, I connect such main spring sections to a rigid curved bar which is non-rotatably connected to the cross bar. In the last mentioned figure, the block 78ᵃ is substantially identical with that shown in Fig. 23 and supports the shackle links 75 in the same manner as shown in such preceding view. The lower end of the bolt 93, however, extends through the central portion of and supports a curved bar 95 which is of such width as to be received fairly snugly between the flanges 6 of the cross bar. The downturned ends of this curved bar are connected by means of bolts or pins 96 to the lugs or ears 86 of the plates 87, which are shown as identical with the like designated parts in Fig. 19.

In all of the various embodiments of my invention disclosed herein, there is disclosed broadly a cross spring comprising two main sections the inner ends whereof are pivotally supported from a cross bar and the intermediate portions whereof are pivotally connected (mediately or immediately) to the cross bar.

Having thus described my invention, what I claim is:—

1. The combination, with an axle, of a member spaced from and extending in the same direction as the axle, a pair of springs, means connecting one end of each spring to the axle, means connecting the opposite end of each spring to the central portion of said member, at least one of such connections being a flexible connection, and means connecting an intermediate portion of each spring to said member.

2. The combination, with an axle, of a member spaced from and extending in the same direction as the axle, a pair of springs, means connecting one end of each spring to the axle, means flexibly supporting the opposite end of each spring from the member, and a movable connection between an intermediate portion of each spring and the said member.

3. The combination, with an axle, of a member spaced from and extending in the same direction as the axle, a pair of springs, means connecting one end of each spring to the axle, means connecting the opposite end of each spring to the central portion of said member, and means flexibly connecting an intermediate portion of each spring to said member.

4. The combination, with an axle, of a member spaced from and extending in the same general direction as the axle, said member being of channel shape and having its flanges presented toward the axle, a pair of springs, a connection between an end of each spring and the axle, a connection between the opposite end of each spring and the central portion of said member, and means coöperating with the flanges of said member and connecting an intermediate portion of each spring to said member.

5. The combination, with an axle, of a member spaced from and extending in substantially the same direction as the axle, a pair of springs each having an end supported on the axle, shackles carried by an intermediate portion of said member and connected to the opposite ends of said springs, and a connection between the intermediate portion of each spring and said member.

6. The combination, with an axle, of a member spaced from the axle, said member having flanges projecting toward the axle, a pair of shackles connected to said member and extending beyond said flanges, a pair of springs each having one end connected to the axle and its opposite end to one of said shackles, and means carried by said member and engaging an intermediate portion of each of said springs.

7. The combination, with an axle, of a member spaced from and having flanges projecting toward the axle, a spring, means supporting one end of said spring from the axle, means supporting the opposite end of the spring from said member, and means within the flanges and engaging an intermediate portion of the spring.

8. The combination, with an axle, of a member spaced from and having flanges projecting toward the axle, a spring, means supporting one end of said spring from the axle, means supporting the opposite end of the spring from said member, one of said supporting means being flexible, and a yielding device arranged between the flanges of said member and engaging an intermediate portion of said spring.

9. The combination, with an axle, of a member parallel with and spaced from the axle, a spring, means supporting one end of said spring from the axle, means yieldingly supporting the opposite end of the spring from said member, and a yielding device carried by said member and engaging an intermediate portion of said spring.

10. The combination, with a vehicle axle, of brackets supported from and located near opposite ends of said axle, a cross bar located above and extending in substantially the plane of the axle, a pair of springs each having one end flexibly connected to a bracket, means connecting the opposite end of each spring to the central portion of the cross bar, and a connection between an intermediate portion of each spring and the cross bar.

11. The combination, with a vehicle axle, of a member spaced from and extending in the same general direction as said axle, a pair of springs, means supporting one end of each spring from the axle, means yieldingly supporting the opposite end of each spring from said member, and a spring carried by said member and having its opposite ends operatively engaging intermediate portions of said first mentioned springs.

12. The combination, with an axle, of a member spaced from and extending in the same general direction as the axle, a pair of springs, means supporting an end of each spring from the axle, means yieldingly supporting the opposite end of each spring from the central portion of said member, and a spring carried by the central portion of the member and having its opposite ends extending toward the axle and engaging each an intermediate portion of one of the first mentioned springs.

13. The combination, with an axle, of a member spaced from and extending in substantially the same general direction as the axle, said member having flanges projecting toward the axle, links carried by the central portion of said member and extending on opposite sides of the flanges thereof, a spring carried by the central portion of said member, between the flanges thereof, and a pair of springs each having an end supported by the axle and an end supported by a pair of said links and each having an intermediate portion thereof engaged by an end of the first mentioned spring.

14. The combination, with an axle, of a member spaced from and extending in the same general direction as the axle, said member having flanges presented toward said axle, a spring carried by the central portion of said member between the flanges thereof, a pair of springs each having an end supported from the axle and its opposite end flexibly connected to the central portion of said member, and a bearing plate on an intermediate portion of each of said springs adapted to be engaged by the first mentioned spring.

15. The combination, with an axle, of a member spaced from and extending in the same general direction as the axle, a spring carried by the said member, a pair of springs each having an end supported from the axle and its opposite end yieldingly connected to said member, and a bearing plate on an intermediate portion of each of said springs adapted to be engaged by the first mentioned spring.

16. The combination, with an axle, of a cross bar spaced from and extending in the same direction as the axle, a pair of springs, means yieldingly connecting one end of each of said springs to the axle, and means yieldingly connecting the opposite end of each of said springs to the central portion of the cross bar.

In testimony whereof, I hereunto affix my signature.

MICHAEL M. McINTYRE.